June 16, 1953　　　G. H. CONNORS　　　2,642,110
AUTOMATIC INFLATING DEVICE
Filed March 11, 1949　　　　　　　　　　2 Sheets-Sheet 1
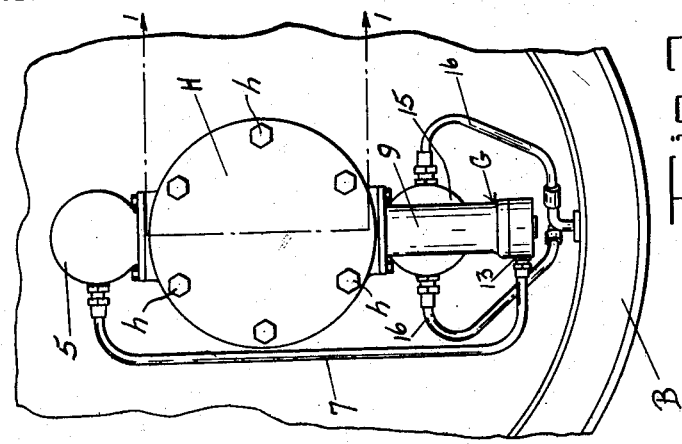
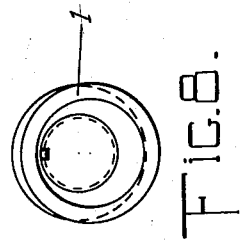
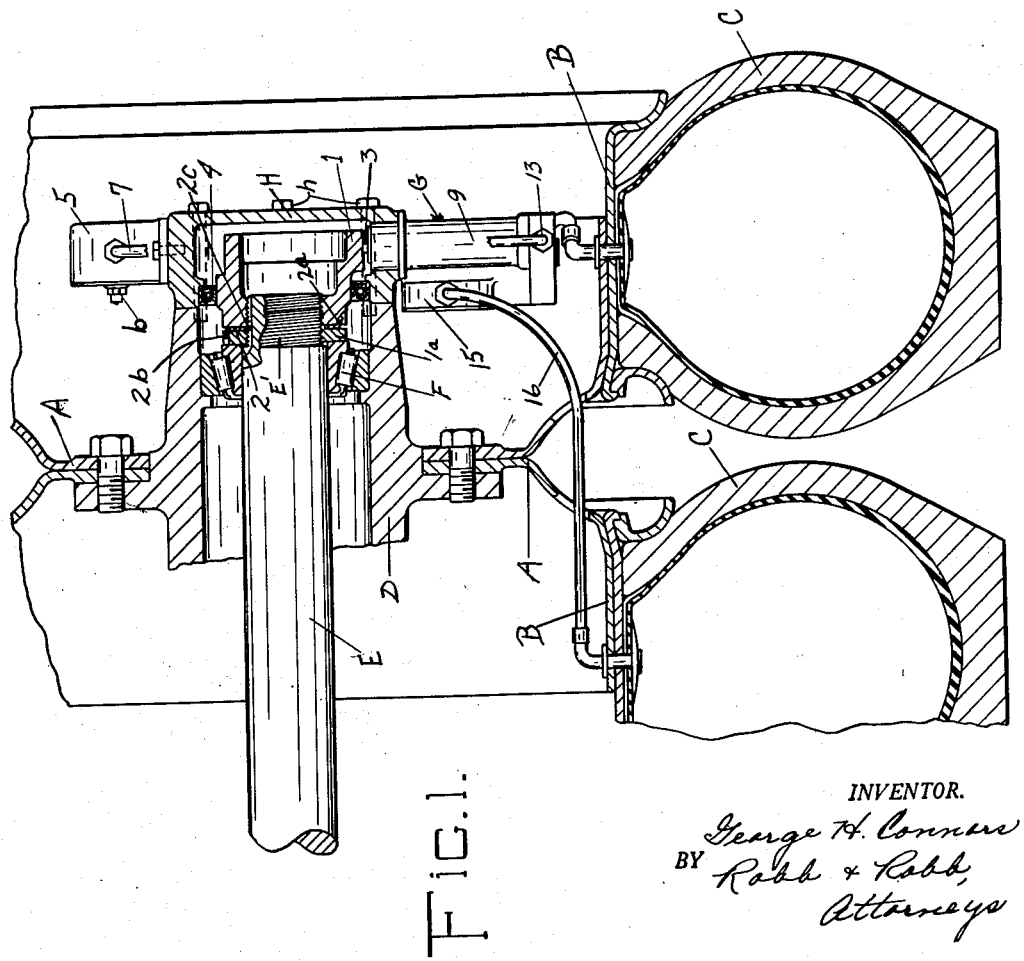
INVENTOR.
George H. Connors
BY Robb & Robb,
Attorneys INVENTOR.
George H. Connors
BY Robb & Robb,
Attorneys Patented June 16, 1953

2,642,110

UNITED STATES PATENT OFFICE 2,642,110

AUTOMATIC INFLATING DEVICE

George H. Connors, Edgerton, Wis., assignor to Highway Trailer Company, Edgerton, Wis., a corporation Application March 11, 1949, Serial No. 80,940

2 Claims. (Cl. 152—421)

The object of my present invention has been to produce an improved construction of automatic tire inflator unit to be used for inflating the tires of automotive vehicles, and especially useful in conjunction with tires of heavy trucks, trailers and like vehicles. My invention however, is adapted for use in conjunction with smaller vehicles and is therefore not limited to the heavier class of vehicles first above referred to.

Automatic tire inflators have long been known in the art but as heretofore constructed have embodied certain objectionable features that have largely caused discontinuance of their use. The principal objections to the automatic inflators of the prior art have arisen due to the fact that the pumping means of the inflator when installed required continuous operation thereof during the traveling movement of the vehicle. In the prior inflators provision was appropriately made whereby the air pumped to the tire under normal inflating conditions would be by-passed into the atmosphere after a tire or tires were inflated to the predetermined pressure required for normal operation. But when the said predetermined pressure was reached the mechanism of the prior tire inflators would continue to operate the pumping means thereby producing wear on the moving parts such as to greatly shorten the life of the same.

Another objection to the automatic tire inflators of the prior art resides in the fact that the construction thereof was such that they were mounted between the spokes of steel wheels in such a manner that the cam follower at the lower end of the pump piston would ride on a cam located on the axle spindle midway between the inner and outer spindle bearings. Such construction cannot be used to any large extent today because of the trend of automotive vehicle construction requiring the adoption of disc wheels so generally in use at this time, thus making the location of the automatic tire inflator or pumping means, as heretofore availed of, impossible.

Still another objection to the prior art inflating units of the type referred to involved the hazard that the axle lubricant in many instances would enter the tires by way of the pump, thus rendering the operative action of the former constructions entirely objectionable on this particular account.

Reference is made to constructions such as shown in U. S. Patent #1,792,123 in conjunction with the above description of the former type of automatic tire inflator once generally used and which has been made obsolete for reasons above stated as well as having the objectionable features recited.

In the carrying out of my invention therefore I have endeavored to provide a construction of tire inflating unit adapted to be applied to disc wheels of the type generally in use today and which eliminate the objectionable features of construction and operation to which I have referred above.

A full understanding of my improvements of the present invention and the construction and merits thereof, will be had upon reference to the following detailed description in conjunction with the accompanying drawing in which:

Figure 1 is a fragmentary sectional view showing an ordinary type of dual disc steel wheel of the customary automotive construction equipped with an automatic tire inflator embodying my invention, the arrangement of the tires upon the wheel and the connection between the automatic pumping means for carrying the inflating air from the latter to the tires being clearly shown. The hub portion and retaining nut section is on line 1—1 of Figure 2.

Figure 2 is a fragmentary view in elevation of certain parts illustrated in Figure 1 looking toward the outer side of the pumping unit.

Figure 3:
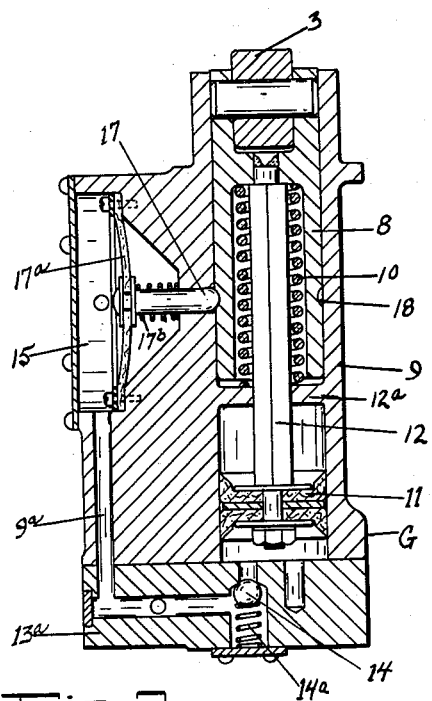
Figure 3 is a vertical sectional view through the body of the pumping unit.
Figure 4:
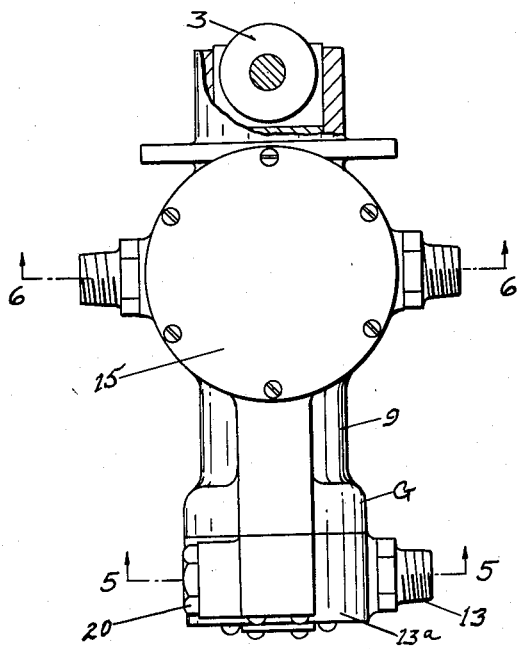
Figure 4 is a view in elevation showing primarily the parts illustrated in Figure 3 looking toward the unit of Figure 3 from a direction at the left of said unit.
Figure 6:
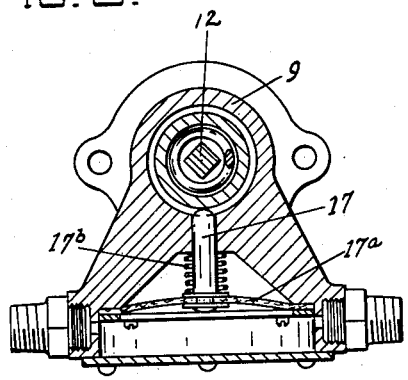
Figure 7:
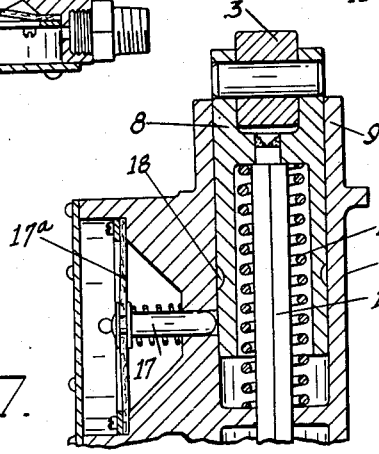

Figure 6 is a detailed sectional view taken on about the line of 6—6 of Figure 4 looking in the direction of the arrows. Figure 7 is a fragmentary sectional view showing the construction of the upper portion of Figure 3 with the lock pin for holding the pumping piston out of operation, disengaged from said piston, as compared with Figure 3 in which said lock pin is interengaged or interlocked with the piston to hold it against being continuously operated during the travel movement of the wheel, after the tires are fully inflated.

Figure 8 is a view in detail showing a little more clearly the construction of the cam nut on the outer end of the axle spindle by which nut the roller follower on the pumping piston is moved to reciprocate the piston to produce its pumping action during the tire inflating operation of the unit.

It will be understood that the disc wheel A as shown in my drawings is of a conventional type such as commonly in use today. It is equipped with the usual rims B, that support the tires C in the customary manner for removal and replacement. The wheel A is mounted upon the spindle E by means of the usual hub D and the outer end of the spindle E is threaded as customary, as shown at E'. The threaded portion of the spindle E in the ordinary disc wheel construction such as shown in the drawings receives the usual type of nut, prior to the installation of the pumping unit of my invention.

Now in carrying out my invention the hub D of the wheel A is held on the axle in the usual manner, but for this purpose I employ a nut 1 at the outer end of which is provided an eccentric cam portion, such nut being substituted for the nut that is commonly found on and employed for attaching the disc wheel A to the spindle E. In other words the cam nut of my invention performs the usual function of retaining the wheel on the spindle but in addition thereto it provides an actuator for the pumping unit to be later set forth. The nut 1 as seen in the drawings is held in place against movement by the usual lock washer 2, one outer lip 2a of which is bent into a slot in the hub of the nut 1, another outer lip 2b of the washer being bent into a slot in the inner nut 1a, and the inner lip or key 2c of the washer being seated in the keyway on the spindle E.

The tire inflating pumping unit G of my invention is mounted upon a special hub cap H which houses the outer end of the nut 1 and lies in a plane about vertically central of the outer rim B and tires C mounted thereon.

The pumping unit generally designated G comprises a piston cylinder 9 in which is mounted the piston 11, the piston rod 12 of which is of poly-sided or square formation so as to pass through a square opening in a partition 12a intermediate the ends of the cylinder 9, the piston rod 12 being guided in the partition 12a and being prevented from rotating by reason of the cross sectional formation of the piston rod and the opening in the partition 12a.

A spring 10 encircles the portion of the piston rod 12 at the side of the partition 12a opposite that on which the piston 11 itself is disposed and said spring 10 bears at one end against the adjacent side of the partition 12a and at the opposite end against the end wall of the piston member 8 remote from the piston head 11. The piston head 11 is the pumping piston of the pumping unit and the piston 8 is a guiding piston body equipped at the end thereof remote from the partition 12a with a follower roller 3. The normal action of the spring 10 is to force the piston body 8 toward the cam nut 1 and maintain the follower roller 3 against the eccentric outer portion of the nut 1, as well as to produce the suction movement of the piston head 11 coincidental with the movement of the piston body 8. The relation between the follower roller 3 and the eccentric portion of the nut 1 is maintained constant because the piston rod 12 is prevented from turning in its bearing portion at the partition 12a, as indicated above. Movement of the piston head 11 in the suction direction caused by the action of the spring 10 will draw air through an air cleaner 5 mounted on hub cap H to which pumping unit G is secured. An air pipe 7 leads from the cleaner 5 to the intake valve 13 located in a passage in the head at the outer end of the pumping unit G designated 13a. In this manner the air is drawn into the cylinder 9 and as the piston 11 travels in the outward radial direction of its movement, or compression direction said air is forced into the tires C past a check valve 14 in said head 13a, the air passing through an angular passage 9a formed in the parts 9 and 13a and entering a chamber 15 located on the inner side of the pumping unit and suitably formed in the integral body of the cylinder member 9. From the chamber 15 the air passes to pipes 16 leading from opposite sides of the chamber 15, one of the pipes being connected to the outer tire C and the other of said pipes being connected to the inner tire C.

In the chamber 15 there is located a pressure actuated locking pin 17 which is connected to a diaphragm 17a fixed to the peripheral wall of the chamber 15 and adapted to flex inwardly and outwardly. The pin 17 is adapted to enter and move out of a recess 18 located in the outer peripheral wall of the piston body 8.

Around the pressure actuated locking pin 17 is a specially calibrated spring 17b which controls the action of said pin in a manner to be later described in conjunction with the operation of the diaphragm 17a.

Figure 5:
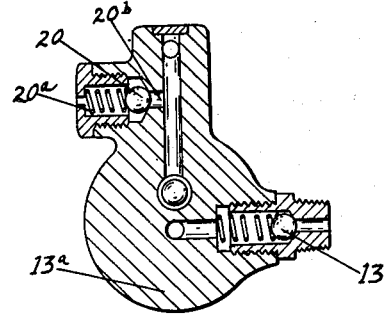
Figure 5 is a detailed sectional view taken on about the line 5—5 of Figure 4 looking in the direction of the arrows.

Seen best in Figure 5 of the drawings the head 13a at the outer end of the piston unit cylinder 9 is provided with an outlet valve 20 the spring 20a of which is calibrated to compress at a pressure slightly greater than that required to fully inflate the tire and the purpose of this valve 20 will appear more fully hereinafter. The said valve is arranged to control passage of air from the cylinder 9 on compression strokes of the piston 11 by reason of the arrangement of the valve 20 in conjunction with the passage 20b, which passage leads from the valve passage itself to the atmosphere to the upper end of the piston cylinder 9.

Having in view the construction of my automatic tire inflating unit as before presented, I will now describe the operation of the mechanism under ordinary conditions of use.

It will be apparent from the mounting of the pumping unit including the cylinder 9, upon the wheel of A, that the said unit and the two conduits or pipes 16 will rotate with the wheel so that the cam follower or roller 3 follows around the cam or eccentric portion of the nut 1 causing the piston 8 and its connected piston head 11 to reciprocate back and forth in the cylinder 9, the nut 1 producing the compression stroke by the action of the rise of the cam on the nut 1 acting on the roller 3, the spring 10 producing the suction stroke incident to forcing the piston head 11 in the direction of the partition 12a in the cylinder 9.

As the piston 11 travels in the suction direction the air is drawn through the air strainer 5 into the cylinder 9 through the intake valve 13 and as the piston head 11 travels in the compression or outwardly radial direction of its movement the said air is forced into the tires by passing through the passage 9a, by the check valve 14, into the chamber 15 and through the pipes or conduits 16 to the tires. When the tires are inflated to the desired pressure equal pressure is present in chamber 15. At such time and under such pressure condition the pin 17 will be forced into the groove 18 of the piston body 8 and will hold stationary said piston body and its connected piston head 11, at the end of the compression stroke as long as this full inflation pressure in the tires is maintained. Of course when the pin 17 interlocks in the groove 18 of the member 8 the follower roller 3 is held clear of the cam portion of the nut 1 and the pumping action of the piston head 11 will be discontinued. Under such conditions of course the inflation of the tires C being obtained at the desired full inflation pressure it is unnecessary to continue the operation of the pumping means, and it is highly desirable that the moving parts cease their operation to avoid the wear and tear incident to the latter when the pumping means is not desired to function for further inflation purposes. The spring 17b is so calibrated as to compress at the predetermined desired high pressure so as to effect the interlocking of the pin 17 with the member 8 to stop the operation of the pumping means and the pressure in the tires acts through the diaphragm 17a upon the pin 17 and the spring 17b to control the foregoing action when pressure in the tires C lowers beyond the point at which the maximum pressure is desired to be maintained, the spring 17b will withdraw the pin 17 from the groove 18 of the piston body 8 and the pumping operation of the piston head 11 will be resumed incident to the reciprocating movement of the parts 8 and 11 induced by the cooperative action of the spring 10 and the rolling contact of the follower member 3 on the nut 1.

The valve 20 is a safety valve as it controls the passage of air through the passage 20b, from within the outermost portion of the cylinder 9 at the outer side of the piston head 11. The safety valve 20 affords protection against over-inflation of the tires C, the springs 20a of said valve being calibrated to compress at a pressure slightly greater than that required for maximum pressure inflation of the tires. Under this condition, if for any reason pumping is not stopped by the arresting of the movement of the reciprocating piston parts 8 and 11, incident to improper action of the lock pin 17, the valve 20 will open and the air being pumped, in excess of the amount required to provide the predetermined normal pressure in the tires C, will exhaust into the atmosphere. A spring 14a coacts with the check valve 14.

The ease of mounting of my pumping unit upon the wheel and axle is of importance to my invention. The parts of my invention are so constructed as to facilitate the foregoing phase of the invention.

It is notable also that I employ the common or conventional form of commercial oil seal designated 4 as seen in my drawing in contact with the concentric hub portion of the cam nut 1 and this oil seal 4 will effiectively prevent any of the axle lubricant from entering the pump and ultimately being pumped into the tires C.

Screw bolts h are employed to attach the hub cap H to the adjacent outer end of the hub D of the wheel A.

Having thus described my invention, what I claim as new and desire to secure by Letters Patent of the United States, is:

1. In combination, a wheel, axle means supporting said wheel, a pneumatic tire on the wheel, an automatic pumping unit comprising a movable pumping member, an air conduit connecting the unit to the tire to supply inflating air to the latter, means mounting the said unit on the wheel to turn therewith, an instrumentality on the axle means to actuate the movable pumping member as the wheel rotates on the axle means, said mounting means comprising a hub cap for an end of the axle means and housing said instrumentality, bearing means between the axle means and the wheel, and a lubricant seal between the bearing means and the pumping unit.

2. In combination, a wheel, axle means supporting said wheel, a pneumatic tire on the wheel, an automatic pumping unit comprising a movable pumping member, an air conduit connecting the unit to the tire to supply inflating air to the latter, means mounting the said unit on the wheel to turn therewith, an instrumentality on the axle means to actuate the movable pumping member as the wheel rotates on the axle means, and mechanism including a diaphragm mounted in a chamber of the unit, said chamber being connected by the air conduit aforesaid to the tire, and said diaphragm being provided with a locking member the presence of the air in the tire effecting actuation of said diaphragm and member controlled by the pressure of the air in the tire for incapacitating the pumping member when the air pressure in the tire reaches a predetermined amount, to prevent over inflation of the tire, the mounting means for the pumping unit comprising a hub cap for the axle unit and the actuating instrumentality comprising a nut for attaching the wheel to the axle means, antifriction bearings are provided between the wheel at its hub portion and the axle means, and a lubricant seal is interposed between the hub cap and the nut arranged to seal the pumping unit from the passage of lubricant thereto from the bearings.

GEORGE H. CONNORS.

References Cited in the file of this patent
UNITED STATES PATENTS

| Number | Name | Date |
|---|---|---|
| 1,265,211 | Keith | May 7, 1918 |
| 1,278,387 | Risk | Sept. 10, 1918 |
| 1,288,826 | Cahill | Dec. 24, 1918 |
| 1,358,524 | Cooper | Nov. 9, 1920 |
| 1,517,782 | Harper | Dec. 2, 1924 |
| 1,792,123 | Rymal | Feb. 10, 1931 |
| 1,804,192 | Wilson | May 5, 1931 |
| 2,231,812 | Long et al. | Feb. 11, 1941 |
| 2,317,636 | Parker | Apr. 27, 1943 |
| 2,415,618 | West | Feb. 11, 1947 |